United States Patent
Holwerk et al.

(10) Patent No.: US 8,123,440 B2
(45) Date of Patent: Feb. 28, 2012

(54) CUTTING TOOL COMPONENTS WITH WEAR-RESISTANT CLADDING LAYER

(75) Inventors: Charles Hunter Holwerk, New Albany, IN (US); Otis Karl Tennant, Underwood, IN (US); Christian Bannehr Gray, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 12/388,551

(22) Filed: Feb. 19, 2009

(65) Prior Publication Data

US 2010/0209206 A1    Aug. 19, 2010

(51) Int. Cl.
B26D 7/26    (2006.01)
B26D 7/00    (2006.01)

(52) U.S. Cl. .................................. 407/119; 407/102

(58) Field of Classification Search ............ 407/102.119; 76/101; 125/39
See application file for complete search history.

(56) References Cited

U.S. PATENT DOCUMENTS

| | | | |
|---|---|---|---|
| 3,743,556 A | 7/1973 | Breton et al. | |
| 3,754,309 A | 8/1973 | Jones et al. | |
| 3,864,799 A * | 2/1975 | McCreery et al. | 407/101 |
| 4,008,976 A | 2/1977 | Holzl | |
| 4,194,040 A | 3/1980 | Breton et al. | |
| 4,884,476 A * | 12/1989 | Okuzumi et al. | 76/101.1 |
| 5,193,945 A * | 3/1993 | Nakayama et al. | 407/66 |
| 5,442,981 A * | 8/1995 | Vegh | 82/1.11 |
| 6,457,914 B1 | 10/2002 | Andras et al. | |
| 6,649,682 B1 | 11/2003 | Breton et al. | |
| 6,935,441 B2 * | 8/2005 | Dykstra et al. | 175/57 |
| 7,262,240 B1 | 8/2007 | Breton et al. | |
| 2002/0119017 A1* | 8/2002 | Gates et al. | 407/100 |
| 2007/0065331 A1 | 3/2007 | Kawasaki et al. | |
| 2007/0099023 A1 | 5/2007 | Dulac et al. | |

FOREIGN PATENT DOCUMENTS

JP    56055564 A    5/1981

OTHER PUBLICATIONS

U.S. Appl. No. 11/863,398, filed Sep. 28, 2007, Holwerk.

* cited by examiner

Primary Examiner — Will Fridie, Jr.
(74) Attorney, Agent, or Firm — Matthew W. Gordon

(57) ABSTRACT

A wear-resistant cladding layer for cutting tool components. A cutting tool includes a tool holder and a clamp structured and arranged for releasably securing an insert to the tool holder. The cutting tool also includes a wear-resistant cladding layer brazed on at least a portion of the clamp and/or brazed on at least a portion of the tool holder, wherein the wear-resistant cladding layer comprises hard particles and a brazing material.

20 Claims, 2 Drawing Sheets

CUTTING TOOL COMPONENTS WITH WEAR-RESISTANT CLADDING LAYER

FIELD OF THE INVENTION

The present invention relates to cutting tool components and, more particularly, relates to wear-resistant cladding layers for cutting tool components.

BACKGROUND INFORMATION

Cutting tools such as, for example, a metal cutting tool for removing material from a work piece are generally known. Typically, a cutting tool includes a tool holder and a clamping arrangement for releasably securing an insert to the tool holder. Various forms of such clamping arrangements have been proposed. For example, U.S. Pat. No. 3,754,309 to Jones et al. discloses a cutting insert and clamping arrangement therefore wherein a clamping member includes a rounded nose adapted for engagement with a groove formed in the cutting insert. U.S. Pat. No. 3,864,799 to McCreery et al. discloses a tool holder that includes a clamp member for clamping an insert to a tool holder shank.

In cutting tool turning operations, chips produced by the insert can interfere with cutting operations. In the '799 patent to McCreery et al., a portion of the clamp member facing the cutting edge is beveled off so as to serve as a chip breaker or chip deflecting member and facilitate getting the chips away from the cutting region. This results in the chip breaking face of the clamp member as well as the immediate area surrounding the clamp and cutting edge being subjected to severe wear and abrasion. In the '799 patent to McCreery et al., the clamp member can be provided with a hardening and/or friction reducing treatment. Specifically, this can be accomplished by forming the clamp member of an air hardening steel, applying a relatively thin coat of titanium carbide to the chip breaking surface using a vapor deposition process (e.g., physical vapor deposition (PVD)) or by applying a boradizing treatment to the chip breaking surface of the clamp member. However, it has been determined that such hardening and/or friction reducing treatments fail to provide adequate wear and abrasion resistance.

The present invention has been developed in view of the foregoing.

SUMMARY OF THE INVENTION

The present invention provides a wear-resistant cladding layer for cutting tool components. During cutting tool turning operations, various components of a cutting tool are subjected to abrasive wear due to, for example, chips produced by a cutting insert of the cutting tool. Therefore, it would be advantageous to have cutting tools and/or components of cutting tools with improved wear and abrasion resistance.

An aspect of the present invention is to provide a cutting tool that comprises a tool holder and a clamp structured and arranged for releasably securing an insert to the tool holder. The cutting tool also comprises a wear-resistant cladding layer brazed on at least a portion of the clamp and/or brazed on at least a portion of the tool holder, wherein the wear-resistant cladding layer comprises hard particles and a brazing material.

Another aspect of the present invention is to provide a tool holder for clamping an insert that comprises a tool holder body including an insert receiving pocket and a clamp structured and arranged for releasably securing the insert to the tool holder body. The tool holder for clamping an insert further comprises a wear-resistant cladding layer brazed on at least a portion of the clamp and/or brazed on at least a portion of the tool holder body, wherein the wear-resistant cladding layer comprises hard particles and a brazing material.

A further aspect of the present invention is to provide a clamp for releasably securing an insert to a tool holder that comprises a clamp body structured and arranged for mounting to the tool holder and a wear-resistant cladding layer brazed on at least a portion of the clamp body. The wear-resistant cladding layer comprises hard particles and a brazing material.

An additional aspect of the present invention is to provide a cutting tool that comprises a cutting tool component and a wear-resistant cladding layer brazed on at least a portion of the cutting tool component. The wear-resistant cladding layer comprises hard particles and a brazing material. The cutting tool component may include, for example, a clamp, a seat member, or a tool holder. It will be appreciated that the cutting tool component may include other components commonly associated with a cutting tool for which it may be desirable to apply the wear-resistant cladding layer for improved wear and abrasion resistance.

These and other aspects of the present invention will be more fully understood following a review of this specification and drawings.

DETAILED DESCRIPTION

Figure 1:
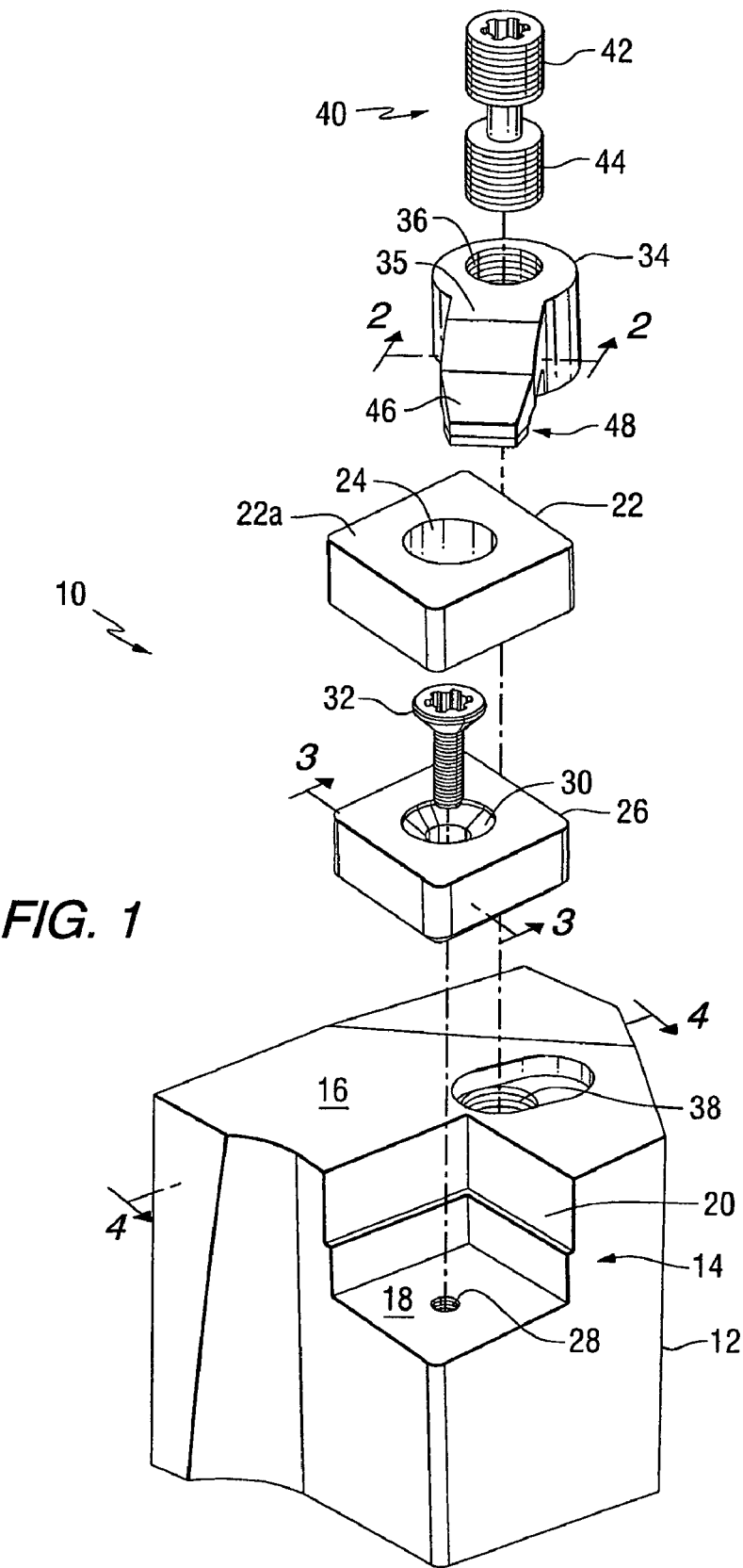
FIG. 1 is an exploded side perspective view of a tool holder, in accordance with an aspect of the invention.

FIG. 1 is an exploded side perspective view of a tool holder assembly 10, in accordance with an aspect of the invention. The tool holder assembly 10 includes a tool holder body 12 having an insert-receiving pocket 14 formed in its upper surface 16 at a corner of its forward end portion. The insert receiving pocket 14 has a bottom 18 and side walls 20. An insert 22 having a mounting bore 24 formed therethrough is disposed on the bottom 18 of the pocket 14 with a seat member 26 interposed therebetween. Although the insert 22 can be any shape, the illustrated insert 22 is generally square in shape having a top surface 22a. An internally threaded bore 28 is formed in the bottom 18 of the pocket 14, and a bore 30 having an upper portion tapering downward is formed through the seat member 26. The seat member 26 is fixedly secured to the insert-receiving pocket 14 by means of a countersunk screw 32 inserted through the bore 30 and screwed into the threaded bore 28.

Still referring to FIG. 1, a clamp 34 is arranged on the upper surface 16 of the tool holder body 12. Formed generally in the center of the clamp 34 in the clamp body 35 is an aperture 36 which has approximately the same diameter as the clamp-securing bore 38 formed in the tool holder body 12. The aperture 36 is formed so that its axis is concentric with the axis of the clamp-securing bore 38. The clamp 34 is secured to the tool holder body 12 by means of a double-ended clamp screw 40 having opposite threaded portions 42, 44 which is screwed into the threaded clamp-securing bore 38 and the aperture 36 of the clamp 34. The lower face of the forward portion 46 of the clamp body 35 includes a generally downwardly protruding nose portion 48 to be held in engagement with the inside surface of the mounting bore 24 of the insert 22, as is generally known.

Figure 2A:
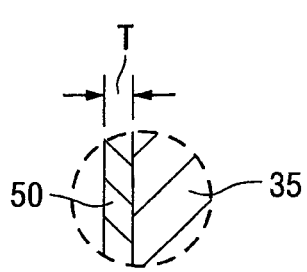
FIG. 2a is an enlarged view of area 2a shown in FIG. 2, in accordance with an aspect of the invention.
Figure 2:
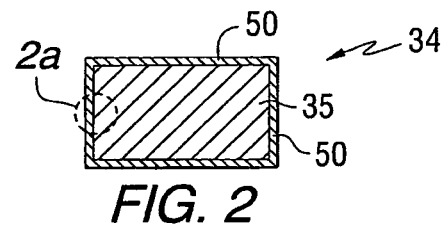
FIG. 2 is a sectional view of a clamp taken at the section line 2-2 of FIG. 1, in accordance with an aspect of the invention.

FIG. 2 is a sectional view of the clamp 34 taken at the section line 2-2 of FIG. 1, in accordance with an aspect of the invention. As shown in FIG. 2, a wear-resistant cladding layer 50 is provided on at least a portion of a periphery of the clamp body 35 of clamp 34. FIG. 2 illustrates the cladding layer 50 as applied to essentially the entire periphery of the clamp body 35, but it will be appreciated that the cladding layer 50 may be applied to only a portion of the periphery of the clamp body as desired to provide wear-resistance. Moreover, it has been contemplated that the cladding will be useful on other tool holding components in other tool holding applications.

As shown in FIG. 2a, the wear-resistant cladding layer 50 has a thickness T that may be in the range of about 0.003 inches to about 0.100 inches, for example, from about 0.007 inches to about 0.030 inches.

The cladding layer 50 includes hard particles and a braze material that are applied to the clamp body 35 utilizing a flexible cloth. In one aspect, the hard particles and braze material may be applied together in the same flexible cloth. In another aspect, alternating layers of cloth separately containing either the hard particles or the braze material are used. The clamp body 35 with the layer(s) of cloth containing the hard particles and braze material is placed in an inert or reducing atmosphere furnace and then heated to a brazing temperature of the braze material, i.e., above the solidus temperature of the braze material. The braze material infiltrates into the hard particles and brazes them to each other and to the clamp body 35.

The hard particles may comprise, for example, cemented carbides, nitrides, borides and/or carbonitrides. One example of a suitable hard particle is cobalt cemented tungsten carbide particles. For example, these particles comprise between about 5 weight percent and about 11 weight percent cobalt and between about 89 weight percent and about 95 weight percent tungsten carbide. The cemented tungsten carbide particles have a size that typically ranges between about 2 micrometers and about 500 micrometers. Other examples of suitable cemented hard particles, in addition to cemented tungsten carbide, include cemented vanadium carbide, cemented niobium carbide, cemented chromium carbide, cemented titanium carbide, cemented tantalum carbide, cemented molybdenum carbide, cemented hafnium carbide, cemented silicon carbide and cemented boron carbide. Cemented oxides such as aluminum oxide, zirconium oxide and hafnium oxide may also be used as the hard particles.

The braze material may comprise a nickel-based alloy with alloying additions of chromium, boron, silicon, tungsten, titanium, molybdenum, iron and/or cobalt. As used herein, the term "nickel-based" means an alloy comprising at least 50 weight percent nickel. In one aspect of the invention, the nickel-based braze material comprises from 5 to 20 weight percent Cr, from 2 to 5 weight percent B, and the balance Ni. A typical nickel-based braze material is a nickel-chromium-boron braze alloy having the following composition: 15.5 weight percent Cr; 4.0 weight percent B; and the remainder Ni. The braze alloy may also contain melting point suppressants including, for example, silicon and phosphorus in amounts appropriate to achieve the desired melting properties.

The cladding material may further include organic binders such as polymeric agents. A preferred binder is polytetrafluoroethylene that is sold by Dupont under the name Teflon.

The cloth impregnated with the hard particles may be rolled to a predetermined thickness, forming a flexible cloth that maintains a uniform weight and readily conforms to the shape of the component, e.g. the clamp 34. The cloth is then cut to shape and applied with a low temperature adhesive. Another cloth containing the braze material powder is then applied onto the layer of hard particle cloth. After the impregnated cloth layers are applied on the component, they are heated to a brazing temperature of the braze material to effect the metallurgical bonding of the hard particles together and to the component. The molten braze alloy capilates down into the layer of hard particles, metallurgically bonding the hard particles to each other and to the component and forming the wear-resistant cladding. The heating step bonds the cloth layer(s) into a wear-resistant coating on the component.

In another aspect of the invention, a single flexible cloth is made with a mixture of the hard particles and braze material and then applied to the component, e.g., the clamp 34. Heating to a brazing temperature of the braze material, as described above, results in brazing of the hard particles together and to the component.

The brazing temperatures can vary depending upon the properties of the braze material, but exemplary temperatures range between a lower limit of about 550° C. and an upper limit of about 1,230° C. It should also be appreciated that the heating process to affect the metallurgical bonding may include multiple steps.

The wear-resistant cutting tool components of the present invention have been found to possess very high abrasion resistance, for example, the abrasion resistance is typically above 100 ARF. As used herein, ARF refers to Abrasion Resistance Factor.

Figure 3:
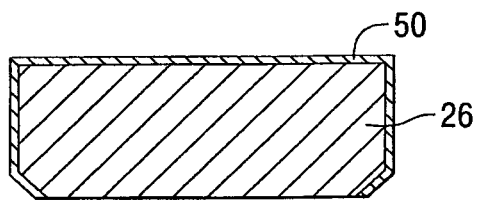
FIG. 3 is a sectional view of a seat member taken at the section line 3-3 of FIG. 1, in accordance with an aspect of the invention.

FIG. 3 is a sectional view of the seat member 26 taken at the section line 3-3 of FIG. 1, in accordance with an aspect of the invention. As shown in FIG. 3, a wear-resistant cladding layer 50 is provided on at least a portion of a periphery of the seat member 26. The wear-resistant cladding layer 50 provided on the seat member 26 has a thickness in the same range as described herein for the cladding layer 50 provided on the clamp body 35. The wear-resistant cladding layer 50 provided on the seat member 26 is formed on the seat member 26 in the same manner as described herein for the cladding layer 50 formed on the clamp body 35.

Figure 4:
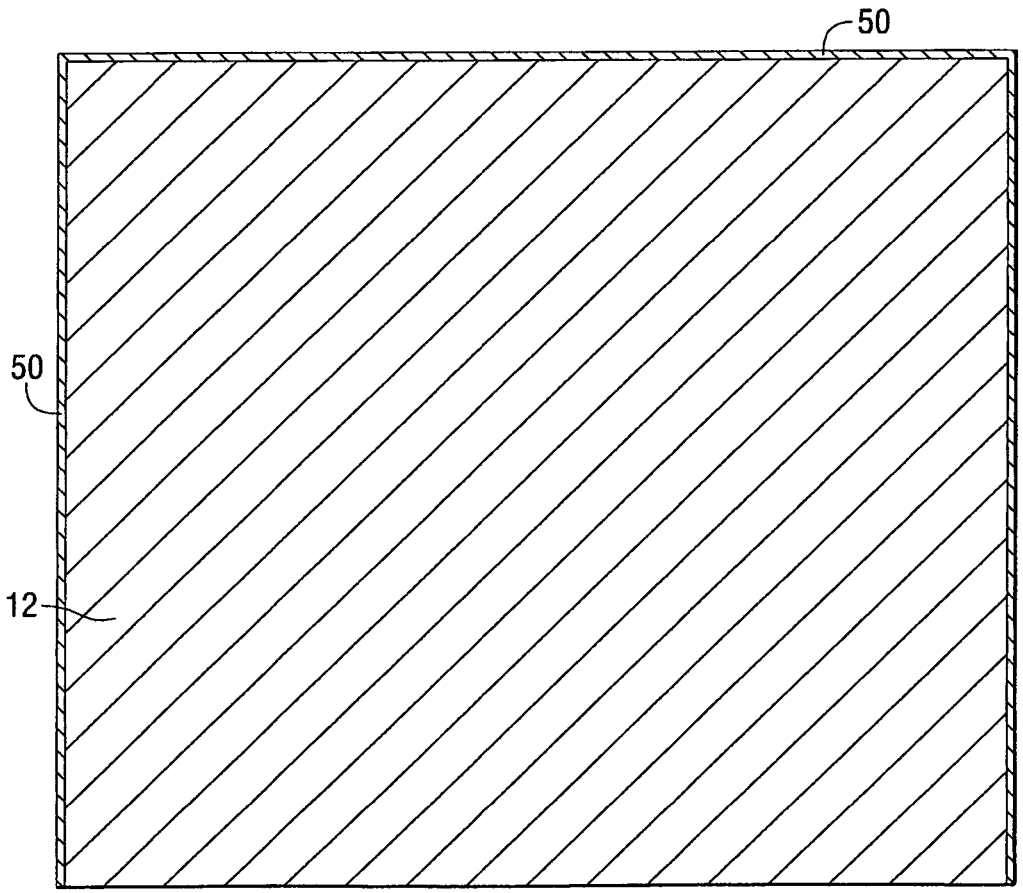
FIG. 4 is a sectional view of a tool holder body taken at the section line 4-4 of FIG. 1, in accordance with an aspect of the invention.

FIG. 4 is a sectional view of the tool holder body 12 taken at the section line 4-4 of FIG. 1, in accordance with an aspect of the invention. As shown in FIG. 4, a wear-resistant cladding layer 50 is provided on at least a portion of a periphery of the tool holder body 12. The wear-resistant cladding layer 50 provided on the tool holder body 12 has a thickness in the same range as described herein for the cladding layer 50 provided on the clamp body 35. The wear-resistant cladding layer 50 provided on the tool holder body 12 is formed on the seat member 26 in the same manner as described herein for the cladding layer 50 formed on the clamp body 35.

As shown in FIGS. 2-4, the wear-resistant cladding layer can be provided on one or more components (e.g., the clamp body 35, the seat member 26 and/or the tool holder body 12) of the tool holder assembly 10 so as to provide increased wear-resistance and abrasion resistance for these components from chips produced by the insert during cutting tool turning operations. It will be appreciated that the wear-resistant cladding layer may be applied to other components of a cutting tool or components associated with a cutting tool or turning operations, other than the specific components illustrated and described herein, to provide increased wear-resistance and abrasion resistance as desired.

In one aspect, the invention described herein provides longer life of the cutting tool components due to the relatively high thickness, metallurgical bonding provided by the brazing, high tungsten carbide wear particle content, and hard matrix (>55 HRc). Other technologies such as, for example PVD coatings have thinner coatings and have ARF values of less than 50 versus the coating solution described herein that has an ARF typically above 100. The coating described herein also provides a metallurgical bond of the coating to the substrate; this bond provides the strength to ensure that the coating remains intact during severe service.

Table 1 illustrates comparative test results for a clamp, such as clamp 34 described herein. Specifically, Table 1 illustrates test results for an uncoated clamp, a PVD coated clamp, and two clamps each having the wear resistant cladding layer in accordance with the invention and labeled, respectively, as $1^{st}$ cladding clamp and $2^{nd}$ cladding clamp. The tests were performed using Okuma® LC50 and LU45 lathes to machine cast iron truck brake drums. As shown, the clamps having the wear resistant cladding layer of the invention performed significantly better and have a significantly increased tool life than the uncoated clamp and the PVD coated clamp. Specifically, the uncoated clamp failed (i.e., was no longer operable for its intended purpose) after machining 430 brake drums and the PVD coated clamp failed after machining 1,300 brake drums. In comparison, the $1^{st}$ cladding clamp did not fail after machining 3,375 brake drums and $2^{nd}$ cladding clamp did not fail after machining 2,345 brake drums.

TABLE 1

| CLAMP TYPE | # OF BRAKE DRUMS MACHINED |
|---|---|
| Uncoated Clamp | 430 |
| PVD Coated Clamp | 1,300 |
| $1^{st}$ Cladding Clamp | >3,375 |
| $2^{nd}$ Cladding Clamp | >2,345 |

Thus, it will be appreciated that the applied wear resistant cladding layer described herein provides for increasing the various components time in the machine resulting in a reduction to cost of replacement parts and machine downtime. The wear resistant cladding layer will also provide a safer working environment due to the length of the life of the components to resist premature failure. The coated components have shown in testing to last significantly longer than the components that do not include the wear resistant cladding layer, as illustrated herein.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting tool, comprising:
   a tool holder;
   a clamp structured and arranged for releasably securing an insert to the tool holder; and
   a wear-resistant cladding layer brazed on at least a portion of the clamp and/or brazed on at least a portion of the tool holder, the wear-resistant cladding layer comprising a flexible cloth containing hard particles and a flexible cloth containing a brazing material that are applied and heated together so that the brazing material infiltrates the hard particles and brazes the hard particles to each other and to the portion of the clamp and/or the portion of the tool holder.

2. The cutting tool of claim 1, wherein the wear-resistant cladding layer has a thickness from about 0.003 inches to about 0.100 inches.

3. The cutting tool of claim 1, wherein the brazing material comprises a nickel-based brazing alloy.

4. The cutting tool of claim 3, wherein the nickel-based brazing alloy comprises from about 5 to about 20 weight percent Cr, from about 2 to about 5 weight percent B, and the balance Ni and incidental impurities.

5. The cutting tool of claim 1, wherein the hard particles comprise a cemented carbide.

6. The cutting tool of claim 1, wherein the hard particles comprise cobalt cemented tungsten carbide.

7. The cutting tool of claim 1, wherein the wear-resistant cladding layer comprises a first layer containing one of the hard particles or the brazing material and a second layer containing the other of the hard particles or the brazing material not contained in the first layer.

8. A tool holder for clamping an insert, comprising:
   a tool holder body including an insert receiving pocket;
   a clamp structured and arranged for releasably securing the insert to the tool holder body; and
   a wear-resistant cladding layer brazed on at least a portion of the clamp and/or brazed on at least a portion of the tool holder body, the wear-resistant cladding layer comprising a flexible cloth containing hard particles and a flexible cloth containing a brazing material that are applied and heated together so that the brazing material infiltrates the hard particles and brazes the hard particles to each other and to the portion of the clamp and/or the portion of the tool holder.

9. The tool holder of claim 8, wherein the wear-resistant cladding layer has a thickness from about 0.003 inches to about 0.100 inches.

10. The tool holder of claim 8, wherein the brazing material comprises a nickel-based brazing alloy.

11. The tool holder of claim 10, wherein the nickel-based brazing alloy comprises from about 5 to about 20 weight percent Cr, from about 2 to about 5 weight percent B, and the balance Ni and incidental impurities.

12. The tool holder of claim 8, wherein the hard particles comprise a cemented carbide.

13. The tool holder of claim 8, wherein the hard particles comprise cobalt cemented tungsten carbide.

14. The tool holder of claim 8, further including a seat member fixedly secured to the insert receiving pocket, the seat member positioned between the insert and insert receiving pocket, wherein the seat member includes an additional wear-resistant cladding layer brazed on at least a portion thereof.

15. A clamp for releasably securing an insert to a tool holder, comprising:
   a clamp body structured and arranged for mounting to the tool holder; and
   a wear-resistant cladding layer brazed on at least a portion of the clamp body, the wear-resistant cladding layer comprising a flexible cloth containing hard particles and a flexible cloth containing a brazing material that are applied and heated together so that the brazing material infiltrates the hard particles and brazes the hard particles to each other and to the portion of the clamp and/or the portion of the tool holder.

16. The clamp of claim 15, wherein the wear-resistant cladding layer has a thickness from about 0.003 inches to about 0.100 inches.

17. The clamp of claim 15, wherein the brazing material comprises a nickel-based brazing alloy.

18. The clamp of claim 17, wherein the nickel-based brazing alloy comprises from about 5 to about 20 weight percent Cr, from about 2 to about 5 weight percent B, and the balance Ni and incidental impurities.

19. A cutting tool, comprising:
a cutting tool component; and
a wear-resistant cladding layer brazed on at least a portion of the cutting tool component, the wear-resistant cladding layer comprising a flexible cloth containing hard particles and a flexible cloth containing a brazing material that are applied and heated together so that the brazing material infiltrates the hard particles and brazes the hard particles to each other and to the portion of the clamp and/or the portion of the tool holder.

20. The apparatus of claim 19, wherein the cutting tool component includes one of a clamp, a seat member, or a tool holder.

\* \* \* \* \*

UNITED STATES PATENT AND TRADEMARK OFFICE
CERTIFICATE OF CORRECTION

PATENT NO. : 8,123,440 B2
APPLICATION NO. : 12/388551
DATED : February 28, 2012
INVENTOR(S) : Charles Hunter Holwerk et al.

Page 1 of 1

It is certified that error appears in the above-identified patent and that said Letters Patent is hereby corrected as shown below:

In the Specification

In Column 4, Lines 5-6, delete "polytetraflouroethylene" and insert -- polytetrafluoroethylene --, therefor.

Signed and Sealed this
Twenty-third Day of April, 2013

Teresa Stanek Rea
*Acting Director of the United States Patent and Trademark Office*